Figure 1:
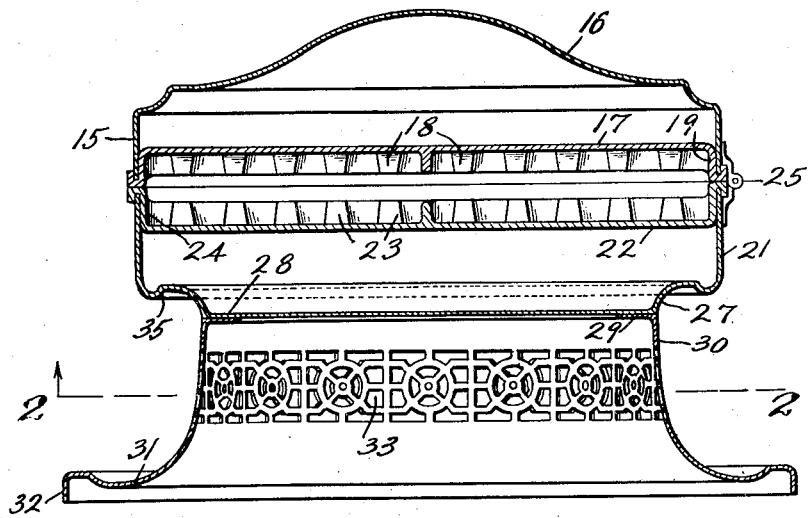

Nov. 18, 1924.                                              1,516,265
G. E. CURTISS
WAFFLE IRON
Filed July 5 1923

Inventor
George E. Curtiss
By his Attorneys

Patented Nov. 18, 1924.

1,516,265

UNITED STATES PATENT OFFICE.

GEORGE E. CURTISS, OF NEW BRITAIN, CONNECTICUT, ASSIGNOR TO LANDERS, FRARY & CLARK, OF NEW BRITAIN, CONNECTICUT, A CORPORATION OF CONNECTICUT.

WAFFLE IRON.

Application filed July 5, 1923. Serial No. 649,713.

*To all whom it may concern:*

Be it known that I, GEORGE E. CURTISS, a citizen of the United States, residing at New Britain, county of Hartford, and State of Connecticut, have invented certain new and useful Improvements in Waffle Irons, fully described and represented in the following specification and the accompanying drawings, forming a part of the same.

This invention relates to waffle irons and the like.

It is the principal object of the invention to provide an improved waffle iron particularly suitable to dining room table use.

With this general object in view the invention consists in the combination, details of construction and arrangements of parts which will first be described in connection with the accompanying drawing and then more particularly pointed out.

In the drawing—

Figure 2:
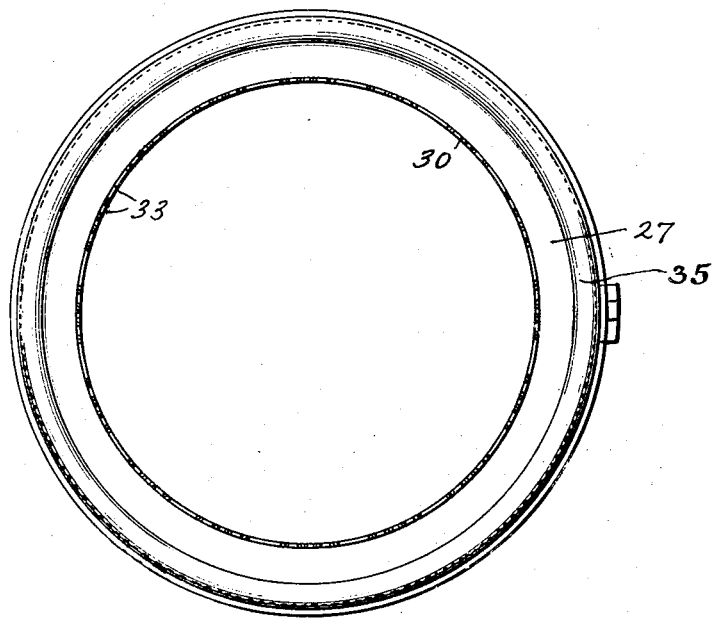

Figure 1 is a vertical cross sectional view of a waffle iron constructed in accordance with the invention; and, Figure 2 is a sectional view taken on the line 2—2 of Fig. 1; looking in the direction of the arrow.

Referring to the drawing, there is provided two complementary casings for cooking elements. As here shown as an example, the upper casing comprises a cylindrical wall 15 and an integral dome or cover 16. Within the casing is a dish-shaped cooking plate 17 having the usual cores 18 thereon for giving the waffles their characteristic formation. At its periphery the plate 17 has a wall-like flange 19 which is turned back over the bottom edge of the casing wall 15. Below this casing is a lower and stationary casing comprising a cylindrical wall 21 and a connection with a support, to be described. Within the casing is a cooking element which is conveniently a duplicate of the upper cooking element and which comprises a plate 22 having the cores 23. A wall or flange 24 has its edge turned back over the top edge of casing wall 21. As appears in Fig. 1, the turned over part of flange 24 forms a seat or ledge for the corresponding part of the upper unit. The upper casing is separable from the lower casing for the introduction of batter and removal of the waffles, the two casings, in the present embodiment, being connected by a hinge 25.

It will be understood that associated with the cooking plates are heating elements; for example electric resistance units. Such elements are well known in the art and are not shown.

The invention in its entirety includes a one-piece support for the two casings that comprises an elevating standard and a tray-like base. As here shown as an example, the cylindrical wall 21 of the lower casing has a connecting portion or skirt 27 which merges into a bottom plate 28. This bottom plate 28 rests on a flange 29 formed on a hollow standard 30. The wall of this standard, the periphery of which is within the periphery of the complementary walls of the two casings, curves outwardly into a tray-like portion 31 which extends beyond the periphery of the casings and has a turned down rim 32. The rim 32 may be provided with rubber or similar feet if desired. The bottom plate 28 may be secured to the flange 29 in any suitable manner, as by welding.

In the present embodiment, the hollow elevating standard is provided with a series of perforations 33 which may be of an ornamental nature, as illustrated. These perforations permit an air circulation through the support and so serve to prevent an excess amount of heat from being conducted to the base and dining room table.

There is provided means for preventing batter that may escape from between the two casings from running down the standard. This may be accomplished, for example, by a bead adjacent the lower edge of the lower casing. To this end, in the present embodiment, the wall of the lower casing, at the termination of its perpendicular portion, is turned inwardly and upwardly to form a peripheral shoulder or bead 35. Beyond this bead, the wall is turned inwardly and downwardly to form the connecting portion 27 above referred to.

In the use of the waffle iron above described, the upper casing is raised to permit the batter to be inserted and is then closed for the cooking operation, in the usual manner. Should any excess batter be squeezed out between the two cooking units it can slide down the perpendicular wall 24 of the lower casing and drop to the tray 31 where it may be readily cleaned off. Such batter, however, is prevented from reaching the supporting standard because it cannot pass the bead 35. While the cooking elements are being heated the support is cooled, by the air circulation through the hollow standard. The support described is capable of economical manufacture and at the same time its tray-like base eliminates the necessity for a separate tray.

While the invention has been described in connection with a round waffle iron, it is to be understood that it is not limited to any particular shape.

What I claim is:

1. A waffle iron, or the like, comprising two complementary casings for cooking elements, located one above the other, a downwardly extending connecting skirt on the lower casing having an inwardly turned flange, and a support comprising a hollow elevating standard having a series of perforations therein and having an inturned flange on which the casing flange is supported.

2. A waffle iron, or the like, comprising two complementary casings for cooking elements, located one above the other, a support comprising an elevating standard of smaller periphery than the periphery of the lower casing and a tray-like base extending beyond the periphery of the casings, and a downwardly extending bead adjacent the lower edge of the wall of the lower casing.

3. A waffle iron, or the like, comprising two complementary casings for cooking elements, located one above the other, the wall of the lower casing being turned inwardly, then upwardly and again inwardly, and a support comprising an elevating standard having its periphery within the periphery of said up-turned portion of the casing wall and a tray-like base extending beyond the periphery of the lower casing.

In testimony whereof, I have hereunto set my hand.

GEORGE E. CURTISS.